(12) United States Patent
Veregin et al.

(10) Patent No.: US 11,815,851 B2
(45) Date of Patent: Nov. 14, 2023

(54) TONER COMPOSITIONS AND ADDITIVES

(71) Applicant: Xerox Corporation, Norwalk, CT (US)

(72) Inventors: Richard Philip Nelson Veregin, Mississauga (CA); Kimberly D. Nosella, Ancaster (CA); Raysa Rodriguez Diaz, Burlington (CA); Cuong Vong, Hamilton (CA); Sandra J. Gardner, Oakville (CA); Majid Kamel, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 152 days.

(21) Appl. No.: 17/213,295

(22) Filed: Mar. 26, 2021

(65) Prior Publication Data

US 2022/0308487 A1 Sep. 29, 2022

(51) Int. Cl.
*G03G 9/087* (2006.01)
*G03G 9/093* (2006.01)
(Continued)

(52) U.S. Cl.
CPC ....... *G03G 9/08728* (2013.01); *C08F 212/36* (2013.01); *C08F 220/1806* (2020.02); *C08F 220/22* (2013.01); *C08F 220/34* (2013.01); *C08K 3/22* (2013.01); *G03G 9/0806* (2013.01); *G03G 9/0819* (2013.01); *G03G 9/08755* (2013.01); *G03G 9/08793* (2013.01);
(Continued)

(58) Field of Classification Search
CPC ........................ G03G 9/09725; G03G 9/09766
See application file for complete search history.

(56) References Cited

U.S. PATENT DOCUMENTS 4,154,621 A 5/1979 Burke, Jr. et al.
5,445,910 A * 8/1995 Ishikawa ............ G03G 9/08791
430/108.11
(Continued)

FOREIGN PATENT DOCUMENTS

JP 2006163187 A 6/2006

OTHER PUBLICATIONS

ThermoFisher Scientific Safety Data Sheet for Divinylbenzene, 80%, file:///C:/Users/pvajda/Documents/e-Red%20Folder/17213295/0821f780-d72d-467f-8bb4-9e666ee0a30a.pdf, Dec. 27, 2020.*
(Continued)

*Primary Examiner* — Peter L Vajda
(74) *Attorney, Agent, or Firm* — MH2 Technology Law Group LLP

(57) ABSTRACT

Disclosed herein is a toner composition, developer and additive for a toner composition. The toner composition includes toner particles having at least one resin, an optional colorant, an optional wax, and a crosslinked polymer particle on at least a portion of an external surface of the toner particles. The crosslinked polymeric particle on a surface of the toner particles includes at least a hydrophobic monomer comprising a non-fluorinated monomer having a carbon to oxygen (C/O) ratio of 3 or greater or a fluorinated monomer. The crosslinked polymer particle includes a second monomer comprising two or more vinyl groups present in an amount from about 8 wt % to about 40 wt % of the copolymer, a metal oxide and optionally a charge control agent monomer.

19 Claims, 1 Drawing Sheet

(51) Int. Cl.
  *G03G 9/08*      (2006.01)
  *C08F 220/22*    (2006.01)
  *C08F 220/18*    (2006.01)
  *C08F 220/34*    (2006.01)
  *C08F 212/36*    (2006.01)
  *C08K 3/22*      (2006.01)
  *G03G 9/097*     (2006.01)

(52) U.S. Cl.
  CPC ..... *G03G 9/09321* (2013.01); *G03G 9/09725* (2013.01); *C08K 2003/2227* (2013.01); *C08K 2003/2241* (2013.01)

(56) References Cited

U.S. PATENT DOCUMENTS

| | | |
|---|---|---|
| 6,455,219 B1 | 9/2002 | Chen et al. |
| 6,818,679 B2 | 11/2004 | Fukushima et al. |
| 8,663,886 B2 | 3/2014 | Vanbesien et al. |
| 9,568,847 B2 | 2/2017 | Fomitchev et al. |
| 9,926,398 B2 | 3/2018 | Zhang et al. |
| 10,358,557 B1 | 7/2019 | Veregin et al. |
| 10,725,394 B1 | 7/2020 | Veregin et al. |
| 2009/0246682 A1 | 10/2009 | Hara et al. |
| 2009/0311618 A1* | 12/2009 | Lee .................. G03G 9/08708 430/108.4 |
| 2012/0156605 A1 | 6/2012 | Vanbesien et al. |
| 2017/0090314 A1 | 3/2017 | Veregin et al. |
| 2017/0115588 A1 | 4/2017 | Fomitchev et al. |
| 2020/0308328 A1 | 10/2020 | Veregin et al. |
| 2020/0310268 A1 | 10/2020 | Veregin et al. |
| 2022/0137524 A1 | 5/2022 | Veregin et al. |
| 2022/0137526 A1 | 5/2022 | Veregin et al. |

OTHER PUBLICATIONS

U.S. Appl. No. 17/086,516 Final Office Action dated Dec. 21, 2021, 16 pages.
U.S. Appl. No. 17/086,516, Office Action dated Aug. 30, 2021, 11 pages.
U.S. Appl. No. 17/086,519 Office Action dated Sep. 30, 2021, 12 pages.
"Toner Compositions and Additives" application filed Nov. 2, 2020, 51 pages.
"Toner Compositions and Additives" application filed Nov. 2, 2020, 50 pages.
U.S. Appl. No. 17/086,519 Final Office Action dated Feb. 22, 2022, 13 pages.
U.S. Appl. No. 17/086,516, Notice of Allowance dated Apr. 27, 2022, 11 pages.
Veregin, R.P.N., et al., "Toner Compositions and Additives," U.S. Appl. No. 17/476,933, filed Sep. 16, 2021, 58 pages.
Vogt, C. (Authorized Officer), Extended European Search Report for European Application No. 22192994.6 dated Jan. 18, 2023, 7 pages.

* cited by examiner

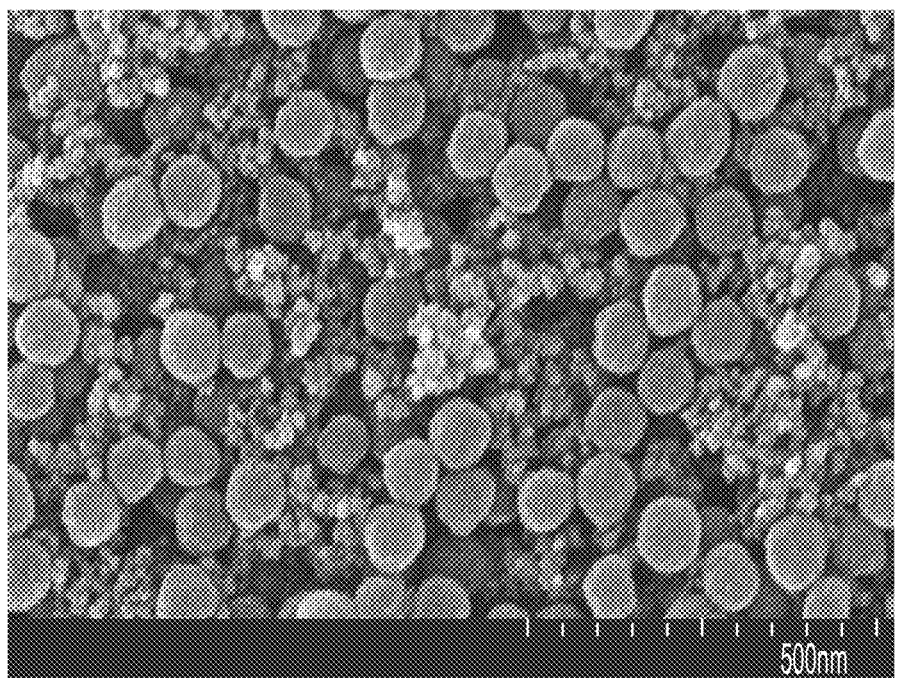

TONER COMPOSITIONS AND ADDITIVES

BACKGROUND

Field of Use

The present disclosure is generally directed to toner compositions, and more specifically, to toner compositions including polymeric additives.

Background

Electrophotographic printing utilizes toner particles that may be produced by a variety of processes. One such process includes an emulsion aggregation ("EA") process that forms toner particles in which surfactants are used in forming a latex emulsion. See, for example, U.S. Pat. No. 6,120,967, the disclosure of which is hereby incorporated by reference in its entirety, as one example of such a process.

Combinations of amorphous and crystalline polyesters may be used in the EA process. This resin combination may provide toners with high gloss and relatively low-melting point characteristics (sometimes referred to as low-melt, ultra low melt, or ULM), which allows for more energy efficient and faster printing. The use of additives with EA toner particles may be important in realizing optimal toner performance, especially in the area of charging.

Issues which may arise with toners include their sensitivity to environmental conditions, including humidity. For example, in the summer months, when it is hot and humid, user complaints arise with respect to the background of an image. In the winter months, when it is cold and dry, light image complaints arise. There may also be a decrease in charge with developer aging, leading to excessive background.

External toner additives such as metal oxide particles are often combined with toner particles in order to improve selected properties of the toner particles, including fluidity, transferability, fixability, and cleaning properties. A variety of external additives may be used in a single toner composition to enhance different properties of the toner. For example, some additives may be selected to improve chargeability, i.e., tribocharge. Others may be selected to improve cleaning performance or humidity resistance. Of course, it is preferable that a toner additive optimized for one function is not detrimental to the functions imparted by the various additives.

There is a continual need for improving the additives used in the formation of EA ULM toners. There is also a need to improve the sensitivity of toner compositions to environmental conditions, including relative humidity.

SUMMARY

According to various embodiments, there is provided a toner composition. The toner composition includes toner particles having at least one resin, an optional colorant, an optional wax, and a polymeric particle on at least a portion of an external surface of the toner particles. The crosslinked polymeric particle on a surface of the toner particles includes at least a hydrophobic monomer comprising a non-fluorinated monomer having a carbon to oxygen (C/O) ratio of 3 or greater or a fluorinated monomer or a combination thereof. The crosslinked polymer particle includes a second monomer comprising two or more vinyl groups present in an amount from about 8 wt % to about 40 wt % of the copolymer, a metal oxide and optionally a charge control agent monomer.

According to various embodiments, there is provided a developer. The developer includes a toner composition and a toner carrier. The toner composition includes toner particles having at least one resin, an optional colorant, an optional wax, and a croaalinked polymer particle on at least a portion of an external surface of the toner particles. The crosslinked polymeric particle on a surface of the toner particles includes at least a hydrophobic monomer comprising a non-fluorinated monomer having a carbon to oxygen (C/O) ratio of 3 or greater or a fluorinated monomer or a combination thereof. The crosslinked polymer particle includes a second monomer comprising two or more vinyl groups present in an amount from about 8 wt % to about 40 wt % of the copolymer, a metal oxide and optionally a charge control agent monomer.

Disclosed herein is a toner additive that includes a polymeric resin. The toner additive includes a crosslinked polymer particle includes at least a hydrophobic monomer comprising a non-fluorinated monomer having a carbon to oxygen (C/O) ratio of 3 or greater or a fluorinated monomer or a combination thereof. The crosslinked polymer particle includes a second monomer comprising two or more vinyl groups present in an amount from about 8 wt % to about 40 wt % of the copolymer, a metal oxide and optionally a charge control agent monomer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 1 shows a scanning electron microscope (SEM) image of a dried sample of according to various embodiments of the disclosure.

It should be noted that some details of the drawings have been simplified and are drawn to facilitate understanding of the embodiments rather than to maintain strict structural accuracy, detail, and scale.

DETAILED DESCRIPTION OF THE EMBODIMENTS

The present disclosure provides polymeric additives for use with toner particles. The polymeric toner additive particle includes a crosslinked polymer particle including a metal oxide, and optionally a charge control agent.

The resulting polymeric toner additive particle may be used as an additive with toner compositions, providing the resulting toner with enhanced sensitivity to relative humidity and charge stability. The polymeric toner additive particles of the present disclosure may also provide toner particles with a wide range of properties including hydrophobicity and charge control, depending on the monomers used in the formation of the polymers. The polymeric toner additive particles also provide good toner powder flow, and toner thermal blocking stability that maintains good toner flow and charge after exposure to high temperature and humidity, such as occurs in storage or in running the printer for long print runs in hot humid conditions. The polymeric toner additive particles also provide stable toner development from the developer to the photoreceptor, and transfer from the photoreceptor to the imaging substrate, or in imaging systems with an intermediate transfer media, from the photoreceptor to the intermediate transfer media, and from the intermediate transfer media to the imaging substrate.

As noted above, the polymeric additive may be in a polymeric particle. In embodiments, a latex copolymer utilized as the additive may include a non-fluorinated hydrophobic monomer having a high C/O ratio, such as an acrylate or a methacrylate. The C/O ratio of such a monomer may be 3 or greater, in embodiments 4 or greater, in embodiments 5 or greater. In embodiments, the hydrophobic monomer can be a fluorinated monomer.

In embodiments, the non-fluorinated hydrophobic monomer having a high C/O ratio may be an aliphatic cycloacrylate. Suitable aliphatic cycloacrylates which may be utilized in forming the polymer additive include, for example, cyclohexylmethacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornylmethacrylate, isobornyl acrylate, benzyl methacrylate, phenyl methacrylate, combinations thereof, and the like. In other embodiments the hydrophobic ethylenically unsaturated polymerizable monomer includes linear or branched acrylates, such as n-butyl (meth)acrylate, isobutyl (meth)acrylate, combinations thereof, and the like.

The hydrophobic monomer may include fluorinated monomers, for example, 2,4,6-fluorophenyl acrylate, pentafluorophenyl acrylate, hexafluoro-iso-propyl methacrylate, 1H,1H,3H-hexafluorobutyl methacrylate, 2,2,2-trifluoroethyl acrylate, 2,2,2-trifluoroethyl methacrylate, 1H,1H,2H,2H-heptadecafluorodecyl methacrylate (HDFDMA), 1H,1H,5H-octafluoropentyl methacrylate, 2,2,3,3,4,4,5,5,6,6,7,7-dodecafluoroheptyl acrylate, 3,3,4,4,5,5,6,6,7,7,8,8,9,9,10,10,11,11,12,12,12-heneicosafluorododecyl acrylate, 3,3,4,4,5,5,6,6,7,7,8,8,9,9,10,10,10-heptadecafluorodecyl methacrylate, 2,2,3,3,4,4,4-heptafluorobutyl acrylate, 2,2,3,3,4,4,4-heptafluorobutyl methacrylate, 2,2,3,4,4,4-hexafluorobutyl acrylate, 2,2,3,4,4,4-hexafluorobutyl methacrylate, 1,1,1,3,3,3-hexafluoroisopropyl acrylate, 1,1,1,3,3,3-hexafluoroisopropyl methacrylate, 2,2,3,3,4,4,5,5-octafluoropentyl methacrylate, 2,2,3,3,3-pentafluoropropyl acrylate, 2,2,3,3,3-pentafluoropropyl methacrylate, 1H,1H,2H,2H-perfluorodecyl acrylate, 2,2,3,3-tetrafluoropropyl methacrylate, 3,3,4,4,5,5,6,6,7,7,8,8,8-tridecafluorooctyl acrylate, 3,3,4,4,5,5,6,6,7,7,8,8,8-tridecafluorooctyl methacrylate, 2,2,2-trifluoroethyl methacrylate, 2-[(1',1',1'-trifluoro-2'-(trifluoromethyl)-2'-hydroxy)propyl]-3-norbornyl methacrylate, perfluorocyclohexyl (meth)acrylate and any combinations thereof and the like.

The polymeric additive may be comprised of any combination of the above described hydrophobic non-crosslinkable monomers, fluorinated and non-fluorinated, in any relative proportion. The total amount of hydrophobic non-crosslinkable monomers incorporated of the total monomer composition may be from about 75 weight percent to about 85 weight percent, from about 70 weight percent to about 90 weight percent from about to about 50 weight percent to about 92 weight percent.

The polymeric toner additive also includes monomer possessing two or more vinyl groups, in embodiments two or more vinyl groups. Suitable monomers having two or more vinyl groups for use as the crosslinking vinyl containing monomer include, for example, diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2'-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2'-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinyl benzene, divinyl naphthaline, divinyl ether, combinations thereof, and the like. In embodiments, the crosslinking agent may be fluorinated. Suitable fluorinated crosslinking agents include fluorinated divinyl crosslinking agents, such as 1,8-divinyl perfluoro(octane), 1,6-divinyl perfluoro(hexane) and 1,4-divinyl perfluoro(butane) and perfluorocyclohexyl (meth)acrylate, combinations thereof, and the like.

The monomer possessing two or more vinyl groups is from 8 weight percent to 40 weight percent of the polymeric resin, from about 8 weight percent to about 30 weight percent of the polymeric resin, from about 10 weight percent to about 20 weight percent of the polymeric resin.

For some commercially available monomers the monomer purity is relatively low. For example, commercial DVB-55 divinylbenzene contains about 55 weight percent divinylbenzene and about 45 weight percent ethylvinylbenzene. Ethylvinylbenzene does not contain two vinyl groups to promote crosslinking, but it does undergo copolymerization with an ethylenically unsaturated monomer. Thus, as an example, for a 55% purity of commercial divinyl benzene, the weight percent divinyl benzene in the final copolymer composition is 0.55×weight percent of divinyl benzene that is added.

An important parameter for the cross-linked polymeric particles is the number of cross-links created in the polymer particles. The number of cross-links per mole of total polymer for a divalent crosslinker is equal to the weight percent crosslinker in the polymer divided by the molecular weight of the crosslinker as the numerator, divided by the denominator, which is the sum of weight percent of each monomer divided by the molecular weight of that monomer. The result is the moles of cross-linking per mole of monomer units, or equivalently, the number of cross-links per monomer unit. For a trivalent crosslinker, the crosslink density is 2-fold higher, as there are two cross-links for every crosslink unit, and for a tetravalent crosslinker, the crosslink density would be 3-fold this value.

Cross-link density is a critical property as this is an important factor to control the rigidity of the polymer particle, its resistance to deformation. In US patent application 2020/0308328, herein incorporated by reference, it was shown that at least 20% of DVB-55 divinylbenzene cross-linker needed to be added so that the cross-linked polymeric particles remained spherical over 1 hours of mixing with developer, which simulated the mixing that toner would see in a printer. If the cross-linked polymer particles flatten then they do not retain their function as a function of mixing, leading to poor performance in the printer. The minimum amount of 20 weight percent of DVB-55 results in a cross-link density, calculated as shown above, of 0.15 cross-links per monomer unit. At 15 weight percent of DVB-55 added, the cross-linked density was 0.11 cross-links per monomer unit, but was insufficient to maintain spherical particles for an hour of aggressive mixing. On the other hand, at 25 weight percent of DVB-55 added, the cross-linked density was 0.19 cross-links per monomer unit, which was sufficient to maintain spherical crosslinked particles for at least 2 hours.

As noted above the polymeric additive includes a metal oxide. The metal oxide is selected from the group of silica, titania and alumina. In embodiments, the weight percent of the metal oxide to the polymeric latex is about 1 percent to about 30 percent, about 5 percent to about 50 percent, about 10 percent to about 40 percent. The particle size of the metal oxide is in the range of from 7 nm to about 120 nm, in embodiments about 7 nm to 50 nm, in embodiments about 7 nm to 20 nm.

A useful measurement for the effectiveness of the added metal oxide is the surface area coverage of that metal oxide on the polymeric latex particle. While not to be limited by theory, it is believe a major function of the added metal oxide is to effectively cover the surface of the polymeric latex, such that when the polymeric additive, comprised of the polymeric latex covered with metal oxide, contacts any surface in the printing device, the metal oxide on the surface provides at least part of that contact, thus changing the surface properties of the polymeric additive, modifying the performance. In order for the metal oxide to effectively coat the organic polymeric additive the metal oxide primary particle size (D50v) must be smaller than the spherical organic additive. If the metal oxide particle were larger, then the metal oxide would instead be coated by the organic latex instead. It is desirable to have the large particle as the organic polymeric particle as the larger particle has the largest volume, which increases as the cube of the size. Since the organic polymeric particle has lower density than the metal oxide particles, there is a lower wt % of organic polymeric particles required than if the metal oxide particles were the larger particle. Further, it is difficult by know methods, including emulsion polymerized polymeric particles, to prepare smaller size particles. It is possible to prepare emulsion polymerized particles as small as 25 nm, however, it may be difficult to get to this small size in manufacturing scale reactors. For larger size polymeric particles that are suitably cross-linked, it is difficult to remove residual monomers when the particle size is larger than 200 nm, which can soften the particle unacceptably due to a plasticization effect, or present an odor problem, or even a health concern. In contrast, low cost metal oxides can be readily manufactured at sizes from about 7 nm to about 50 nm. However, it is difficult and expensive to make metal oxide nano particles in sizes larger than 50 nm. It is possible in some cases to make larger metal oxide particles than 50 nm, for example, colloidal silicas are manufactured up to 300 nm, or even 500 nm. However, these are more expensive. Also, larger particles are too big to adhere to the toner and also tend to provide very poor toner flow, so in practice best overall performance with metal oxides is achieved for particle sizes less than 50 nm, in some embodiments less than about 120 nm. Thus, the most manufacturable and lowest cost will use a larger polymeric latex particle and a smaller metal oxide. Metal oxides may be spherical, but they may also be cubic, or hexagonal, or tabular, or needle-like, or plate-like, or irregular in shape without limitation. In these cases the largest dimension of the metal oxide particle is required to be smaller than the organic polymeric particle.

With respect to the required size ratio of the smaller metal oxide particles to the larger polymeric latex particle, the smaller metal oxide D50 size to the larger polymer latex particle D50 size ratio, is from about 0.035 to about 0.5, from about 0.05 to about 0.4, or from about 0.06 to about 0.3.

Mathematically the general formula for the percentage surface area coverage (% SAC) of the smaller metal particle onto the surface of a larger spherical organic surface additive is given by:

$$\% \text{ SAC} = 100 \cdot w \cdot D \cdot P / (363 \cdot d \cdot p)$$

where for the organic polymeric particles, D is the D50 average size in nanometers and P is the true density in grams/cm$^3$, and for the metal oxide particles, d is the D50 average size in nanometers, p is the true density in grams/cm$^3$, and w is the weight added to the mixture in pph by weight of the organic polymeric particles.

Effective % SAC of the metal oxide particles on the organic polymeric additive particles are from about 1% to about 50%. Below about 1% of the metal oxide particle there is little effect of the added inorganic particle on the performance of the organic polymeric particles. Above about 50% the surface of the organic polymeric particles is effectively covered, in that the organic polymeric particle surface can no longer contact any other surface. Thus additional metal oxide particle coverage provides little change in performance and increases the difficulty of making the particles, and increasing the amount of loose metal oxide particle which can settle out of the latex.

In embodiments, the metal oxide nanoparticles can be treated with a silane coupling agent, in examples an alkyl silane, such as hexamethyldisilazane (HMDS) or a dimethyldichlorosilane, or other long chain alkyl silane such as decyltriethoxysilane or octyltrietheoxysilane, or in examples an alkyl siloxane such as PDMS (polydimethysiloxane). The primary particle size can vary from about 7 nm to about 130 nm. Specific examples of treated silicas, their particle size and their treatment included Wacker HDK® H13TD (16 nm, PDMS), HDK® H13TM (16 nm, HMDS), HDK® H13TX (16 nm, HMDS/PDMS), HDK® H20TD (12 nm, PDMS), HDK® H20TM (12 nm, HMDS), HDK® H20TX (12 nm, HMDS/PDMS), HDK® H30TD (8 nm, PDMS), HDK® H30TM (8 nm, HMDS), HDK® H30TX (8 nm, HMDS/PDMS), HDK® H3004 (12 nm, HMDS), Wacker HDK® HO5TD (40 nm, PDMS), HDK® HO5TM (40 nm, HMDS), HDK® HO5TX (40 nm, HMDS/PDMS); Evonik R972 (16 nm, DDS), RY200S (16 nm, PDMS, BET=200 m$^2$/g), R202 (16 nm, PDMS), R974 (12 nm, DDS), RY200 (12 nm, PDMS), RX200 (12 nm, HMDS), R8200 (12 nm, HMDS), R805 (12 nm, alkyl silane), R104 (12 nm, alkyl silane), RX300 (7 nm, HMDS), R812 (7 nm, HMDS), R812S (7 nm, HMDS, BET=300 m$^2$/g), R106 (7 nm, alkyl silane), NY50 (30 nm, PDMS), NAX50 (30 nm, HMDS), RY50 (40 nm, PDMS), and RX50 (40 nm, HMDS); Cabot TS530 (8 nm, HMDS).

In embodiments, the oxide may also include treatments that for example include bases or salts of those bases. Specific commercially available examples include Wacker treated silicas HDK® H13TA (16 nm, PDMS $-NR_2/NR_3^+$), HDK® H30TA (8 nm, PDMS $-NR_2/NR_3^+$); HDK® H2015EP (12 nm, PDMS $-NR_2/NR_3^+$); HDK® H2050EP (10 nm, PDMS $-NR_2/NR_3^+$); HDK® H2150VP (10 nm, PDMS $-NR_2/NR_3^+$); HDK® H3050VP (8 nm, PDMS $-NR_2/NR_3^+$).

Suitable untreated silicas can include 30 nm Aerosil 50, 40 nm Aerosil OX50, 16 nm Aerosil 130, 12 nm Aerosil 200, 7 nm Aerosil 300, and 7 nm Aerosil 380, all from Evonik.

Examples of suitable commercial treated titanium dioxides include JMT-150IB from Tayca Corp., having a primary diameter of 15 nm, JMT2000 from Tayca Corp., having particle dimensions of 15×15×40 nm, T805 from Evonik having an average primary diameter of about 21 nn, AEROXIDE® TiO$_2$ NKT 90 from Evonik having a primary average diameter of 12 nm, SMT5103 from Tayca Corporation having an average primary diameter of about 40 nm, STT-100H from Inabata America Corporation of average primary diameter of about 40 nm, 40 nm silane coupling agent treated ST-550 from Titan Kogyo, 10×10×50 nm ST-480A and ST-597 silane coupling agent treated titanias from Titan Kogyo, 40 nm alcohol treated STT-65CS 40 nm titania from Titan Kogyo, 50 nm silicone treated STT-30 EHJ titania from Titan Kogyo, and silane coupling agent treated 30 nm ST-30A-1 and 20 nm STT-30S titania from Titan Kogyo. Suitable untreated titanium dioxides can include 21 nm P25 and 12 nm TN90 both from Evonik.

Specific commercial examples of suitable aluminum oxides include Evonik C805 (13 nm, octylsilane), Aluminum Oxide C (13 nm, untreated), Aeroxide Alu C 100 (10 nm, untreated), Aeroxide Alu C 130 (13 nm, untreated); Cabot SpectrAL 81 (21 nm, untreated), and Cabot SpectrAl 100 (18 nm, untreated).

Examples of additional suitable oxides include titanates, including CaTiO$_3$, BaTiO$_3$, MgTiO$_3$, MnTiO$_3$, SrTiO$_3$ and. Al$_2$TiO$_5$. Also suitable are tin oxides and doped tin oxides, such as antimony tin oxide. Further suitable oxides include ZnO$_2$, CaO, MgO, FeO, CrO, MnO, BeO, GA$_2$O$_3$, In$_2$O$_3$, Tl$_2$O$_3$, GeO$_2$, SnO, SnO$_2$, PbO, PbO$_2$, As$_2$O$_3$, Sb$_2$O$_3$, Bi$_2$O$_3$, and Fe$_2$O$_3$.

In embodiments, the metal oxide can be a colloidal silica that is dispersed in water, so it has not been dried in contrast to the other silicas described above. Commercial examples of colloidal silica include 40 to 50 nm SNOWTEX® ST-20L, 10 to 20 nm SNOWTEX® ST-O, 40-50 nm SNOW-TEX® ST-OL, 8 to 11 nm SNOWTEX® ST-OS, 8 to 11 nm SNOWTEX® ST-S, 10 to 20 nm SNOWTEX® ST-AK, 20 to 30 nm SNOWTEX® ST-O40, 20 to 30 nm SNOWTEX® ST-50, all from Nissan Chemical. Other suitable colloidal silicas that are water dispersed include 5 nm LUDOX® FM, 7 nm LUDOX® SM, 7 nm LUDOX® SM-AS, 12 nm LUDOX® HS-40, 12 nm LUDOX® HAS, 22 nm TM-40 LUDOX®, 22 nm LUDOX® AS-40, 22 nm LUDOX® TMA, 15 nm LUDOX® PX-30, 20 nm LUDOX® PT-40 and LUDOX® 40 nm PW-50, all available from Grace.

While it is desirable to use hydrophobic monomers to provide low relative humidity sensitivity for charging, flow, development and transfer in the printer, in embodiments some comonomers that are not necessarily hydrophobic can be included, for example to modify the charging properties of the resin latex. Copolymer additives of the present disclosure include in the polymeric toner additive may also include a monomer having an amine functionality. Monomers possessing an amine functionality may be derived from acrylates, methacrylates, combinations thereof, and the like. In embodiments, suitable amine-functional monomers include dimethylaminoethyl methacrylate (DMAEMA), diethylaminoethyl methacrylate, dipropylaminoethyl methacrylate, diisopropylaminoethyl methacrylate, dibutylaminoethyl methacrylate, combinations thereof, and the like.

The amine-functional monomer may be present in such a copolymer in an amount of from about 0.1% by weight of the copolymer to about 5% by weight of the copolymer, in embodiments from about 0.5% by weight of the copolymer to about 2% by weight of the copolymer.

Ethylenically unsaturated monomers bearing at least one acidic group may also be present as a co-monomer in the polymer nanoparticles of the present disclosure. Such ethylenically unsaturated monomers may bear a side chain carboxylic acid or sulfonic acid. Illustrative examples may include, but are not limited to, maleic acid, methyl hydrogen maleate, ethyl hydrogen maleate, itaconic acid, fumaric acid, crotonic acid, citraconic acid, styrenesulfonic acid, β-carboxyethyl acrylate, acrylic acid, methacrylic acid and 2-aminomethylpropanesulfonic acid derivatized with a vinyl group. Carboxylic acid forms of the foregoing monomers may be present in an esterified form as well, such as methyl, ethyl, propyl, isopropyl, butyl, isobutyl, t-butyl or like esterified form. Other suitable esterified monomers may comprise an ethylenically unsaturated group in the alcohol-derived portion of the esterified monomer. Such ethylenically unsaturated monomers may include, for example, vinyl acetate, allyl acetate, vinyl propionate, allyl propionate, vinyl benzoate, allyl benzoate, and the like.

The acid-functional or esterified acid monomer may be present in such a copolymer in an amount up to about 10% by weight of the copolymer, in embodiments from about 0.5% by weight of the copolymer to about 5% by weight of the copolymer. In embodiments the acid-functional monomer provides a more negative charge to the polymeric latex.

Methods for forming the polymeric toner additive are within the purview of those skilled in the art and include, in embodiments, emulsion polymerization of the monomers and metal oxide utilized to form the polymeric toner additive.

In embodiments, the latex for forming the polymeric toner additive may be prepared in an aqueous phase containing a surfactant or co-surfactant, optionally under an inert gas such as nitrogen. Surfactants which may be utilized with the resin to form a latex dispersion can be ionic or nonionic surfactants in an amount of from about 0.01 to about 15 weight percent of the solids, and in embodiments of from about 0.1 to about 10 weight percent of the solids.

In embodiments, a charge control agent monomer includes a nitrogen containing group, including but are not limited to, dimethylaminoethyl methacrylate, diethylaminoethyl methacrylate, dipropylaminoethyl methacrylate, diisopropylaminoethyl methacrylate, dibutylaminoethyl methacrylate, and combinations thereof.

The charge control agent monomer includes a nitrogen containing group in the polymeric additive is from 0.1 wt % to 1.5 wt % of the polymeric additive, about 0.6 wt % to 1.2 wt %, or about 0.7 wt % to about 1.1 wt %.

Methods for forming the polymeric toner additive include, in embodiments, emulsion polymerization of the monomers utilized to form the polymeric additive. The polymeric additive is prepared by adding the metal oxide the monomer mixture prior to emulsion polymerization of the polymer latex.

In the polymerization process, the reactants including the metal oxide, the hydrophobic monomer and the monomer possessing two or more vinyl groups, may be added to a suitable reactor, such as a mixing vessel. The appropriate amount of starting materials may be optionally dissolved in a solvent, an optional initiator may be added to the solution, and contacted with at least one surfactant to form an emulsion. A polymer additive may be formed in the emulsion, which may then be recovered and used as the polymeric additive for a toner composition.

Where utilized, suitable solvents include, but are not limited to, water and/or organic solvents including toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, combinations thereof, and the like.

In embodiments, a latex for forming the polymeric toner additive may be prepared in an aqueous phase containing a surfactant or co-surfactant, optionally under an inert gas such as nitrogen. Surfactants may be utilized with the resin to form a latex dispersion can be ionic or nonionic surfactants in an amount of from about 0.01 to about 15 weight percent of the solids, and in embodiments of from about 0.1 to about 10 weight percent of the solids.

Anionic surfactants which may be utilized include sulfates and sulfonates, sodium dodecylsulfate (SDS) also known as sodium lauryl sulfate (SLS), sodium dodecylbenzene sulfonate, sodium dodecylnaphthalene sulfate, dialkyl benzenealkyl sulfates and sulfonates, acids such as abietic acid available from Aldrich, NEOGEN™, NEOGEN SC™ obtained from Daiichi Kogyo Seiyaku Co., Ltd., combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $Cu_{12}$, $C_{15}$, $C_{17}$ trimethyl ammonium bromides, combinations thereof, and the like. Other cationic surfactants include cetyl pyridinium bromide, halide salts of quaternized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, combinations thereof, and the like. In embodiments, a suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, combinations thereof, and the like. In embodiments, commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be utilized.

The choice of particular surfactants or combinations thereof, as well as the amounts of each to be used, are within the purview of those skilled in the art.

In embodiments, initiators may be added for formation of the latex utilized in formation of the polymeric toner additive. Examples of suitable initiators include water soluble initiators, such as ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate, and combinations thereof. Other water-soluble initiators which may be utilized include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methyl-propionamidine] dihydrochloride, 2,2'-azobis[N-(4-amino-phenyl)-2-methylpropionamidine]tetrahydrochloride, 2,2'-azobis[2-methyl-N(phenylmethyl)propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2'azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane] dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis{2-[1-(2-hydroxyethyl)-2-imidazolin-2-yl]propane}dihydrochloride, combinations thereof, and the like.

Initiators can be added in suitable amounts, such as from about 0.1 to about 8 weight percent, and in embodiments, of from about 0.2 to about 5 weight percent of the monomers.

In forming the emulsions, including the metal oxide, the starting materials, surfactant, optional solvent, and optional initiator may be combined utilizing any means within the purview of those skilled in the art. In embodiments, the reaction mixture may be mixed for from about 1 minute to about 72 hours, in particular embodiments from about 4 hours to about 24 hours, while keeping the temperature at from about 10° C. to about 100° C., in particular embodiments from about 20° C. to about 90° C. in other particular embodiments from about 45° C. to about 75° C.

Those skilled in the art will recognize that optimization of reaction conditions, temperature and initiator loading can be varied to generate polymers of various molecular weights, and that structurally related starting materials may be polymerized using comparable techniques.

Average particle size measurements of polymer toner additives were determined by dynamic light scattering using a Nanotrac252 instrument (from Microtrac, Inc.).

As used herein, the term "average particle size" refers to a diameter at which 50% of the sample (on a volume basis unless otherwise specified) is comprised of particles having a diameter less than said diameter value. Average particle size may also be referred to as the "D50."

Particle size of polymeric toner particles ranging in size from 0.0008 to 6.54 microns are measured using the Nanotrac 252 instrument. This instrument uses a laser light-scattering technique, Doppler-shifted light generated from each particle in motion (Brownian motion) is measured. The signals generated by these shifts are proportional to the size of the particles. The signals are mathematically converted to particle size and size distribution. The analysis can be performed using an external probe or by inserting the probe into a fixed sample chamber.

For light scattering techniques, NIST polystyrene Nanosphere control samples with a diameter within the range of 15 nm to 150 nm under the tradename NIST Traceable Reference Material for Nanotrac Particle Size Analyzers obtained from Microtrac may be used.

The resulting particles of the polymeric toner additive of the present disclosure, may be applied to toner particles utilizing any means within the purview of one skilled in the art. In embodiments, the toner particles may be dipped in or sprayed with the polymeric additive particles, thus becoming coated on the surface of the toner particles, and the coated particles may then be dried.

In other embodiments, once the polymeric toner additive particles have been formed, they may be recovered from the reactor by any technique within the purview of those skilled in the art, including filtration, drying, centrifugation, spray drying, combinations thereof, and the like.

In embodiments, once obtained, the polymer toner additive particles may be dried to powder form by any method within the purview of those skilled in the art, including, for example, freeze drying, optionally in a vacuum, spray drying, combinations thereof, and the like. The dried polymer toner additive particles of the present disclosure may then be applied to toner particles utilizing any means within the purview of those skilled in the art, including, but not limited to, mechanical impaction and/or electrostatic attraction. An example of mechanical mixing equipment includes the Henschel FM high intensity mixers from Zeppelin Systems, though other mixing equipment may also be used in embodiments.

Particles of the polymer toner additive particles may have an average or medium particle size (D50) of from about 20 nanometers to about 200 nanometers in diameter, in embodiments from about 40 nanometers to about 150 nanometers in diameter.

The polymer additives utilized in the polymer toner additive particles, which, in embodiments, may be soluble in solvents such as tetrahydrofuran (THF), may have a number average molecular weight ($M_n$), as measured by gel permeation chromatography (GPC) of, for example, from about 40,000 to about 280,000 Daltons, in embodiments from about 60,000 to about 170,000 Daltons, and a weight average molecular weight ($M_w$) of, for example, from about 200,000 to about 800,000 Daltons, in embodiments from about 400,000 to about 600,000 Daltons, as determined by Gel Permeation Chromatography using polystyrene standards. In embodiments, due to the cross-linking it may not be possible to measure a molecular weight by any method, due to the limited solubility of the cross-linked resin.

The polymers or polymer additives utilized in the polymer toner additive particles may have a glass transition temperature (Tg) of from about 85° C. to about 140° C., in embodiments from about 100° C. to about 130° C. In embodiments, it may not be possible to determine a Tg due to the resin cross-linking, which can make a Tg difficult to detect. In embodiments, A-zone charge of a toner including the polymeric additive of the present disclosure may be from about −15 to about −80 microcolombs per gram, in embodiments from about −20 to about −60 microcolombs per gram, while C-zone charge of a toner including the polymeric additive of the present disclosure may be from about −15 to about −80 microcolombs per gram, in embodiments from about −20 to about −60 microcolombs per gram.

The polymer toner additive particles of the present disclosure may be combined with toner particles so that the polymer toner additive particles are present in an amount of from about 0.1% by weight of the toner particles to about 5% by weight of the toner particles, in embodiments from about 0.2% by weight of the toner particles to about 2% by weight of the toner particles.

Thus, with polymer toner additive particles of the present disclosure, there can be formulated developers with selected high triboelectric charging characteristics and/or conductivity values utilizing a number of different combinations.

Toners

The polymer toner additive particles thus produced may then be combined with toner resins, optionally possessing colorants, to form a toner of the present disclosure.

Resins

Any toner resin may be utilized in forming a toner of the present disclosure. Such resins, in turn, may be made of any suitable monomer or monomers via any suitable polymerization method. In embodiments, the resin may be prepared by a method other than emulsion polymerization. In further embodiments, the resin may be prepared by condensation polymerization.

The toner composition of the present disclosure, in embodiments, includes an amorphous resin. The amorphous resin may be linear or branched. In embodiments, the amorphous resin may include at least one low molecular weight amorphous polyester resin. The low molecular weight amorphous polyester resins, which are available from a number of sources, can possess various glass transition temperatures of, for example, from about 30° C. to about 80° C., in embodiments from about 35° C. to about 75° C. As used herein, the low molecular weight amorphous polyester resin has, for example, a number average molecular weight ($M_n$), as measured by gel permeation chromatography (GPC) of, for example, from about 1,000 to about 10,000, in embodiments from about 2,000 to about 8,000, in embodiments from about 3,000 to about 7,000, and in embodiments from about 4,000 to about 6,000. The weight average molecular weight ($M_w$) of the resin is 50,000 or less, for example, in embodiments from about 2,000 to about 50,000, in embodiments from about 3,000 to about 40,000, in embodiments from about 10,000 to about 30,000, and in embodiments from about 18,000 to about 21,000, as determined by GPC using polystyrene standards. The molecular weight distribution ($M_w/M_n$) of the low molecular weight amorphous resin is, for example, from about 2 to about 6, in embodiments from about 3 to about 4. The low molecular weight amorphous polyester resins may have an acid value of from about 8 to about 20 mg KOH/g, in embodiments from about 9 to about 16 mg KOH/g, and in embodiments from about 10 to about 14 mg KOH/g.

Examples of linear amorphous polyester resins which may be utilized include poly(propoxylated bisphenol A co-fumarate), poly(ethoxylated bisphenol A co-fumarate), poly(butyloxylated bisphenol A co-fumarate), poly(co-propoxylated bisphenol A co-ethoxylated bisphenol A co-fumarate), poly(1,2-propylene fumarate), poly(propoxylated bisphenol A co-maleate), poly(ethoxylated bisphenol A co-maleate), poly(butyloxylated bisphenol A co-maleate), poly(co-propoxylated bisphenol A co-ethoxylated bisphenol A co-maleate), poly(1,2-propylene maleate), poly(propoxylated bisphenol A co-itaconate), poly(ethoxylated bisphenol A co-itaconate), poly(butyloxylated bisphenol A co-itaconate), poly(co-propoxylated bisphenol A co-ethoxylated bisphenol A co-itaconate), poly(1,2-propylene itaconate), and combinations thereof.

In embodiments, a suitable amorphous resin may include alkoxylated bisphenol A fumarate/terephthalate based polyesters and copolyester resins. In embodiments, a suitable amorphous polyester resin may be a copoly(propoxylated bisphenol A co-fumarate)-copoly(propoxylated bisphenol A co-terephthalate) resin having the following formula (I):

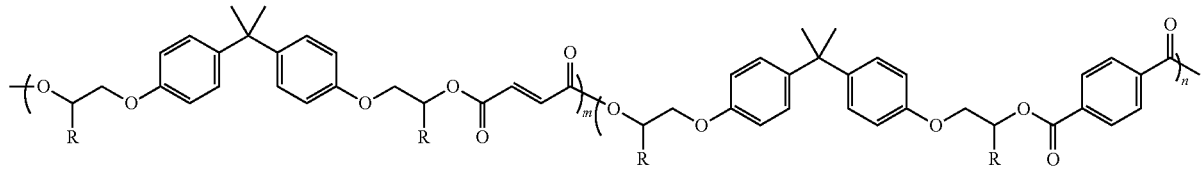

wherein R may be hydrogen or a methyl group, and m and n represent random units of the polymer additive and m may be from about 2 to 10, and n may be from about 2 to 10. Examples of such resins and processes for their production include those disclosed in U.S. Pat. No. 6,063,827, the disclosure of which is hereby incorporated by reference in its entirety.

In embodiments, the low molecular weight amorphous polyester resin may be a saturated or unsaturated amorphous polyester resin. Illustrative examples of saturated and unsaturated amorphous polyester resins selected for the process and particles of the present disclosure include any of the various amorphous polyesters, such as polyethylene-terephthalate, polypropylene-terephthalate, polybutylene-terephthalate, polypentylene-terephthalate, polyhexylene-terephthalate, polyheptadene-terephthalate, polyoctalene-terephthalate, polyethylene-isophthalate, polypropylene-isophthalate, polybutylene-isophthalate, polypentylene-isophthalate, polyhexylene-isophthalate, polyheptadene-isophthalate, polyoctalene-isophthalate, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(ethoxylated bisphenol A-fumarate), poly(ethoxylated bisphenol A-succinate), poly(ethoxylated bisphenol A-adipate), poly(ethoxylated bisphenol A-glutarate), poly(ethoxylated bisphenol A-terephthalate), poly(ethoxylated bisphenol A-isophthalate), poly(ethoxylated bisphenol A-dodecenylsuccinate), poly(propoxylated bisphenol A-fumarate), poly(propoxylated bisphenol A-succinate), poly(propoxylated bisphenol A-adipate), poly(propoxylated bisphenol A-glutarate), poly(propoxylated bisphenol A-terephthalate), poly(propoxylated bisphenol A-isophthalate), poly(propoxylated bisphenol A-dodecenylsuccinate), SPAR (Dixie Chemicals), BECKOSOL (Reichhold Inc), ARAKOTE (Ciba-Geigy Corporation), HETRON (Ashland Chemical), PARAPLEX (Rohm & Haas), POLYLITE (Reichhold Inc), PLASTHALL (Rohm & Haas), CYGAL (American Cyanamide), ARMCO (Armco Composites), ARPOL (Ashland Chemical), CELANEX (Celanese Eng), RYNITE (DuPont), STYPOL (Freeman Chemical Corporation) and combinations thereof. The resins can also be functionalized, such as carboxylated, sulfonated, or the like, and particularly such as sodio sulfonated, if desired.

Examples of suitable polycondensation catalyst for either the low molecular weight amorphous polyester resin include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts may be utilized in amounts of, for example, from about 0.01 mole percent to about 5 mole percent based on the starting diacid or diester used to generate the polyester resin.

The low molecular weight amorphous polyester resin may be a branched resin. As used herein, the terms "branched" or "branching" includes branched resin and/or cross-linked resins.

The resulting unsaturated polyesters are reactive (for example, crosslinkable) on two fronts: (i) unsaturation sites (double bonds) along the polyester chain, and (ii) functional groups such as carboxyl, hydroxy, and the like groups amenable to acid-base reactions. In embodiments, unsaturated polyester resins are prepared by melt polycondensation or other polymerization processes using diacids and/or anhydrides and diols.

In embodiments, the low molecular weight amorphous polyester resin or a combination of low molecular weight amorphous resins may have a glass transition temperature of from about 30° C. to about 80° C., in embodiments from about 35° C. to about 70° C. In further embodiments, the combined amorphous resins may have a melt viscosity of from about 10 to about 1,000,000 Pa*S at about 130° C., in embodiments from about 50 to about 100,000 Pa*S.

The amount of the low molecular weight amorphous polyester resin in a toner particle of the present disclosure, whether in any core, any shell, or both, may be present in an amount of from 25 to about 50 percent by weight, in embodiments from about 30 to about 45 percent by weight, and in embodiments from about 35 to about 43 percent by weight, of the toner particles (that is, toner particles exclusive of external additives and water).

In embodiments, the toner composition includes at least one crystalline resin. As used herein, "crystalline" refers to a polyester with a three dimensional order. "Semicrystalline resins" as used herein refers to resins with a crystalline percentage of, for example, from about 10 to about 90%, in embodiments from about 12 to about 70%. Further, as used hereinafter "crystalline polyester resins" and "crystalline resins" encompass both crystalline resins and semicrystalline resins, unless otherwise specified.

In embodiments, the crystalline polyester resin is a saturated crystalline polyester resin or an unsaturated crystalline polyester resin.

The crystalline polyester resins, which are available from a number of sources, may possess various melting points of, for example, from about 30° C. to about 120° C., in embodiments from about 50° C. to about 90° C. The crystalline resins may have, for example, a number average molecular weight ($M_n$), as measured by gel permeation chromatography (GPC) of, for example, from about 1,000 to about 50,000, in embodiments from about 2,000 to about 25,000, in embodiments from about 3,000 to about 15,000, and in embodiments from about 6,000 to about 12,000. The molecular weight distribution ($M_w/M_n$) of the crystalline resin is, for example, from about 2 to about 6, in embodiments from about 3 to about 4. The crystalline polyester resins may have an acid value of about 2 to about 20 mg KOH/g, in embodiments from about 5 to about 15 mg KOH/g, and in embodiments from about 8 to about 13 mg KOH/g.

Illustrative examples of crystalline polyester resins may include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly(pentylene-dodecanedioate), poly(hexylene-dodecanedioate), poly(octylene-dodecanedioate), poly(nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate) and combinations thereof.

The crystalline resin may be prepared by a polycondensation process by reacting suitable organic diol(s) and suitable organic diacid(s) in the presence of a polycondensation catalyst.

Examples of organic diols selected for the preparation of crystalline polyester resins include aliphatic diols with from about 2 to about 36 carbon atoms.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

In embodiments, a suitable crystalline resin may include a resin composed of ethylene glycol or nonanediol and a mixture of dodecanedioic acid and fumaric acid co-monomers with the following formula (II):

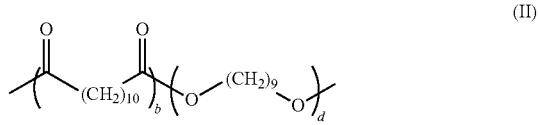

(II)

wherein b is from about 5 to about 2000 and d is from about 5 to about 2000.

If semicrystalline polyester resins are employed herein, the semicrystalline resin may include poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4'-oxydibenzoate), poly(10-hydroxy capric acid), poly(isophthalaldehyde), poly(octamethylene dodecanedioate), poly(dimethyl siloxane), poly(dipropyl siloxane), poly(tetramethylene phenylene diacetate), poly(tetramethylene trithiodicarboxylate), poly(trimethylene dodecane dioate), poly(m-xylene), poly(p-xylylene pimelamide), and combinations thereof.

The amount of the crystalline polyester resin in a toner particle of the present disclosure, whether in core, shell or both, may be present in an amount of from 1 to about 15 percent by weight, in embodiments from about 5 to about 10 percent by weight, and in embodiments from about 6 to about 8 percent by weight, of the toner particles (that is, toner particles exclusive of external additives and water).

In embodiments, a toner of the present disclosure may also include at least one high molecular weight branched or cross-linked amorphous polyester resin. This high molecular weight resin may include, in embodiments, for example, a branched amorphous resin or amorphous polyester, a cross-linked amorphous resin or amorphous polyester, or mixtures thereof, or a non-cross-linked amorphous polyester resin that has been subjected to cross-linking. In accordance with the present disclosure, from about 1% by weight to about 100% by weight of the high molecular weight amorphous polyester resin may be branched or cross-linked, in embodiments from about 2% by weight to about 50% by weight of the higher molecular weight amorphous polyester resin may be branched or cross-linked.

As used herein, the high molecular weight amorphous polyester resin may have, for example, a number average molecular weight ($M_n$), as measured by gel permeation chromatography (GPC) of, for example, from about 1,000 to about 10,000. The high molecular weight amorphous resins, which are available from a number of sources, can possess various onset glass transition temperatures (Tg) of, for example, from about 40° C. to about 80° C., in embodiments from about 50° C. to about 70° C., and in embodiments from about 54° C. to about 68° C., as measured by differential scanning calorimetry (DSC). The linear and branched amorphous polyester resins, in embodiments, may be a saturated or unsaturated resin.

The high molecular weight amorphous polyester resins may prepared by branching or cross-linking linear polyester resins. Branching agents can be utilized, such as trifunctional or multifunctional monomers, which agents usually increase the molecular weight and polydispersity of the polyester. Suitable branching agents include glycerol, trimethylol ethane, trimethylol propane, pentaerythritol, sorbitol, diglycerol, trimellitic acid, trimellitic anhydride, pyromellitic acid, pyromellitic anhydride, 1,2,4-cyclohexanetricarboxylic acid, 2,5,7-naphthalenetricarboxylic acid, 1,2,4-butanetricarboxylic acid, combinations thereof, and the like. These branching agents can be utilized in effective amounts of from about 0.1 mole percent to about 20 mole percent based on the starting diacid or diester used to make the resin.

In embodiments, cross-linked polyesters resins may be made from linear amorphous polyester resins that contain sites of unsaturation that can react under free-radical conditions. In embodiments, suitable unsaturated polyester base resins may be prepared from diacids and/or anhydrides such as, for example, maleic anhydride, terephthalic acid, trimelltic acid, fumaric acid, and the like, and combinations thereof, and diols such as, for example, bisphenol-A ethyleneoxide adducts, bisphenol A-propylene oxide adducts, and the like, and combinations thereof. In embodiments, a suitable polyester is poly(propoxylated bisphenol A co-fumaric acid).

In embodiments, a cross-linked branched polyester may be utilized as a high molecular weight amorphous polyester resin. Examples of such polyesters and methods for their synthesis include those disclosed in U.S. Pat. No. 6,592,913, the disclosure of which is hereby incorporated by reference in its entirety.

Suitable polyols may contain from about 2 to about 100 carbon atoms and have at least two or more hydroxy groups, or esters thereof. Polyols may include glycerol, pentaerythritol, polyglycol, polyglycerol, and the like, or mixtures thereof. The polyol may include a glycerol. Suitable esters of glycerol include glycerol palmitate, glycerol sebacate, glycerol adipate, triacetin tripropionin, and the like. The polyol may be present in an amount of from about 20% to about 30% weight of the reaction mixture, in embodiments, from about 22% to about 26% weight of the reaction mixture.

In embodiments, the cross-linked branched polyesters for the high molecular weight amorphous polyester resin may include those resulting from the reaction of dimethylterephthalate, 1,3-butanediol, 1,2-propanediol, and pentaerythritol.

In embodiments, the high molecular weight resin, for example a branched polyester, may be present on the surface of toner particles of the present disclosure. The high molecular weight resin on the surface of the toner particles may also be particulate in nature, with high molecular weight resin particles having a diameter of from about 100 nanometers to about 300 nanometers, in embodiments from about 110 nanometers to about 150 nanometers.

The amount of high molecular weight amorphous polyester resin in a toner particle of the present disclosure, whether in any core, any shell, or both, may be from about 25% to about 50% by weight of the toner, in embodiments from about 30% to about 45% by weight, in other embodiments or from about 40% to about 43% by weight of the toner (that is, toner particles exclusive of external additives and water).

The ratio of crystalline resin to the low molecular weight amorphous resin to high molecular weight amorphous polyester resin can be in the range from about 1:1:98 to about 98:1:1 to about 1:98:1, in embodiments from about 1:5:5 to about 1:9:9, in embodiments from about 1:6:6 to about 1:8:8.

Surfactants

In embodiments, resins, waxes, and other additives utilized to form toner compositions may be in dispersions including surfactants. Moreover, toner particles may be formed by emulsion aggregation methods where the resin and other components of the toner are placed in one or more surfactants, an emulsion is formed, toner particles are aggregated, coalesced, optionally washed and dried, and recovered.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the toner composition, for example from about 0.75% to about 4% by weight of the toner composition, in embodiments from about 1% to about 3% by weight of the toner composition.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include those mentioned previously. Examples of the cationic surfactants include those mentioned previously.

Colorants

The latex particles produced as described above may be added to a colorant to produce a toner. In embodiments, the colorant may be in a dispersion. The colorant dispersion may include, for example, submicron colorant particles having a size of, for example, from about 50 to about 500 nanometers in volume average diameter and, in embodiments, of from about 100 to about 400 nanometers in volume average diameter. The colorant particles may be suspended in an aqueous water phase containing an anionic surfactant, a nonionic surfactant, or combinations thereof. Suitable surfactants include any of those surfactants described above. In embodiments, the surfactant may be ionic and may be present in a dispersion in an amount from about 0.1 to about 25 percent by weight of the colorant, and in embodiments from about 1 to about 15 percent by weight of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or mixtures thereof.

In embodiments where the colorant is a pigment, the pigment may be, for example, carbon black, phthalocyanines, quinacridones or RHODAMINE B™ type, red, green, orange, brown, violet, yellow, fluorescent colorants, and the like.

The resulting latex, optionally in a dispersion, and colorant dispersion may be stirred and heated to a temperature of from about 35° C. to about 70° C., in embodiments of from about 40° C. to about 65° C., resulting in toner aggregates of from about 2 microns to about 10 microns in volume average diameter, and in embodiments of from about 5 microns to about 8 microns in volume average diameter.

Wax

Optionally, a wax may also be combined with the resin in forming toner particles. When included, the wax may be present in an amount of, for example, from about 1 weight percent to about 25 weight percent of the toner particles, in embodiments from about 5 weight percent to about 20 weight percent of the toner particles.

Waxes that may be selected include waxes having, for example, a weight average molecular weight of from about 500 to about 20,000, in embodiments from about 1,000 to about 10,000. Waxes that may be used include, for example, polyolefins such as polyethylene, polypropylene, and polybutene waxes, plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate.

Toner Preparation

The toner particles may be prepared by any method within the purview of one skilled in the art. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner-particle shape and morphology.

In embodiments, toner compositions may be prepared by emulsion-aggregation processes, such as a process that includes aggregating a mixture of an optional wax and any other desired or required additives, and emulsions including the resins described above, optionally in surfactants as described above, and then coalescing the aggregate mixture. A mixture may be prepared by adding an optional wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 600 to about 6,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1% to about 8% by weight, in embodiments from about 0.2% to about 5% by weight, in other embodiments from about 0.5% to about 5% by weight, of the resin in the mixture. This provides a sufficient amount of agent for aggregation.

Shell Resin

In embodiments, after aggregation, but prior to coalescence, a shell may be applied to the aggregated particles.

Resins which may be utilized to form the shell include, but are not limited to, the amorphous resins described above for use in the core. Such an amorphous resin may be a low molecular weight resin, a high molecular weight resin, or combinations thereof. In embodiments, an amorphous resin which may be used to form a shell in accordance with the present disclosure may include an amorphous polyester of formula I above.

In some embodiments, the amorphous resin utilized to form the shell may be crosslinked. For example, crosslinking may be achieved by combining an amorphous resin with a crosslinker, sometimes referred to herein, in embodiments, as an initiator. Examples of suitable crosslinkers include, but are not limited to, for example free radical or thermal initiators such as organic peroxides and azo compounds described above as suitable for forming a gel in the core.

The crosslinker and amorphous resin may be combined for a sufficient time and at a sufficient temperature to form the crosslinked polyester gel. In embodiments, the crosslinker and amorphous resin may be heated to a temperature of from about 25° C. to about 99° C., in embodiments from about 30° C. to about 95° C., for a period of time from about 1 minute to about 10 hours, in embodiments from about 5 minutes to about 5 hours, to form a crosslinked polyester resin or polyester gel suitable for use as a shell.

Where utilized, the crosslinker may be present in an amount of from about 0.001% by weight to about 5% by weight of the resin, in embodiments from about 0.01% by weight to about 1% by weight of the resin. The amount of CCA may be reduced in the presence of crosslinker or initiator.

Coalescence

Following aggregation to the desired particle size and application of any optional shell, the particles may then be coalesced to the desired final shape, the coalescence being achieved by, for example, heating the mixture to a temperature from about 45° C. to about 100° C., in embodiments from about 55° C. to about 99° C., which may be at or above the glass transition temperature of the resins utilized to form the toner particles, and/or reducing the stirring, for example from about 100 rpm to about 400 rpm, in embodiments from about 200 rpm to about 300 rpm. The fused particles can be measured for shape factor or circularity, such as with a SYSMEX FPIA 2100 analyzer, until the desired shape is achieved.

Coalescence may be accomplished over a period from about 0.01 to about 9 hours, in embodiments from about 0.1 to about 4 hours.

Subsequent Treatments

In embodiments, after aggregation and/or coalescence, the pH of the mixture may then be lowered to from about 3.5 to about 6 and, in embodiments, to from about 3.7 to about 5.5 with, for example, an acid, to further coalesce the toner aggregates. Suitable acids include, for example, nitric acid, sulfuric acid, hydrochloric acid, citric acid and/or acetic acid. The amount of acid added may be from about 0.1 to about 30 percent by weight of the mixture, and in embodiments from about 1 to about 20 percent by weight of the mixture.

The mixture may be cooled, washed and dried. Cooling may be at a temperature of from about 20° C. to about 40° C., in embodiments from about 22° C. to about 30° C., over a period of time from about 1 hour to about 8 hours, in embodiments from about 1.5 hours to about 5 hours.

In embodiments, cooling a coalesced toner slurry may include quenching by adding a cooling media such as, for example, ice, dry ice and the like, to effect rapid cooling to a temperature of from about 20° C. to about 40° C., in embodiments of from about 22° C. to about 30° C. Quenching may be feasible for small quantities of toner, for example, less than about 2 liters, in embodiments from about 0.1 liters to about 1.5 liters. For larger scale processes, such as for example greater than about 10 liters in size, rapid cooling of the toner mixture may not be feasible or practical, neither by the introduction of a cooling medium into the toner mixture, or by the use of jacketed reactor cooling.

The toner slurry may then be washed. The washing may be carried out at a pH of from about 7 to about 12, in embodiments at a pH of from about 9 to about 11. The washing may be at a temperature of from about 30° C. to about 70° C., in embodiments from about 40° C. to about 67° C. The washing may include filtering and reslurrying a filter cake including toner particles in deionized water. The filter cake may be washed one or more times by deionized water, or washed by a single deionized water wash at a pH of about 4, wherein the pH of the slurry is adjusted with an acid, and followed optionally by one or more deionized water washes.

Drying may be carried out by any method within the purview of one skilled in the art. Any suitable method of drying toner particles may be used, including freeze drying, spray drying and flash drying such as an Aljet dryer. The drying may be continued until the moisture level of the particles is below a set target of about 1% by weight, in embodiments of less than about 0.7% by weight.

Additives

In embodiments, toner particles may contain the polymer toner additive particles of the present disclosure described above, as well as other optional additives, as desired or required. For example, the toner may include positive or negative charge control agents, for example in an amount from about 0.1 to about 10 weight percent of the toner, in embodiments from about 1 to about 3 weight percent of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, triboelectric charge enhancement, admix control, improved development and transfer stability, and higher toner blocking temperature. $TiO_2$ may be applied for improved relative humidity (RH) stability, triboelectric charge control and improved development and transfer stability. Zinc stearate, calcium stearate and/or magnesium stearate may optionally also be used as an external additive for providing lubricating properties, developer conductivity, triboelectric charge enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount from about 0 weight percent to about 3 weight percent of the toner, in embodiments from about 0.25 weight percent to about 2.5 weight percent of the toner, although the amount of additives can be outside of these ranges. In embodiments, the toners may include, for example, from about 0 weight percent to about 3 weight percent titania, from about 0 weight percent to about 3 weight percent silica, and from about 0 weight percent to about 3 weight percent zinc stearate.

In embodiments, in addition to the polymer toner additive particles of the present disclosure, toner particles may also possess silica in amounts of from about 0.1% to about 5% by weight of the toner particles, in embodiments from about 0.2% to about 2% by weight of the toner particles, and titania in amounts of from about 0% to about 3% by weight of the toner particles, in embodiments from about 0.1% to about 1% by weight of the toner particles.

Developers

The toner particles thus formed may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Carriers

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Other carriers include those disclosed in U.S. Pat. Nos. 3,847,604, 4,937,166, and 4,935,326.

In embodiments, suitable carriers may include a steel core, for example of from about 25 to about 100 μm in size, in embodiments from about 50 to about 75 μm in size, coated with about 0.5% to about 10% by weight, in embodiments from about 0.7% to about 5% by weight of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations are may be from about 1% to about 20% by weight of the toner composition. However, different toner and carrier percentages may be used to achieve a developer composition with desired characteristics.

Imaging

The toners can be utilized for electrostatographic or electrophotographic processes, including those disclosed in U.S. Pat. No. 4,295,990, the disclosure of which is hereby incorporated by reference in its entirety. In embodiments, any known type of image development system may be used in an image developing device, including, for example, magnetic brush development, jumping single-component development, hybrid scavengeless development (HSD), and the like. These and similar development systems are within the purview of those skilled in the art.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member.

The following Examples are being submitted to illustrate embodiments of the present disclosure. These Examples are intended to be illustrative only and are not intended to limit the scope of the present disclosure. Also, parts and percentages are by weight unless otherwise indicated.

EXAMPLES

Organic Additive Latex Preparation with Silica:

Example 1: Synthesis of Organic Additive Latex with 7.5% TS530 Silica

In a 2 L buchi reactor, equipped with two HE3 type impellers, 3.75 g of SLS surfactant (at 30% solids) was added to 816 g deionized water (DIW). The reactor was deoxygenated by passing a stream of nitrogen through it during the reaction. The reactor was ramped to 77° C. and the rpm was set to 350. Separately, in a 1 L glass vessel, equipped with two P4 impellers, a monomer emulsion was prepared by mixing (at 450 rpm) 24.12 g TS530 silica, 237 g cyclohexylmethacrylate (CHMA), 80 g DVB, 2.56 g dimethyl-amino-ethylmethacrylate (DMAEMA), 9.18 g sodium lauryl sulfate (SLS) surfactant (at 30% solids) and 416 g DIW together. A 38.4 g of seed was taken from the monomer emulsion and pumped into the 2 L reactor at 77° C. An initiator solution prepared from 1.22 g of ammonium persulfate in 34.3 g of DIW was added over 20 minutes after the seed emulsion addition. The remaining monomer emulsion was fed into the reactor over 120 min. Once half the monomer emulsion was added the rpm in the reactor was increased to 450 rpm. At the end of the monomer feed, the latex used a post-processing protocol of 1 hr at 77° C. followed by a 2 hr ramp to 87° C. and a 1 hr hold at 87° C. to reduce residual monomer at the end of the emulsion polymerization step. The reactor rpm was further increased to 530. The resulting latex containing 20% percent solids and a particle size of 82 nm was obtained.

Example 2. Synthesis of Organic Additive Latex with 3.5% Snowtex OS and 4% Aerosil A380 Silicas In a 2 L buchi reactor, equipped with two HE3 type impellers, 3.75 g of SLS surfactant (at 30% solids) and 53.2 g Snowtex OS (at 21% solids) was added to 773 g DIW. The reactor was deoxygenated by passing a stream of nitrogen through it during the reaction. The reactor was ramped to 77° C. and the rpm was set to 350. Separately, in a 1 L glass vessel, equipped with two P4 impellers, a monomer emulsion was prepared by mixing (at 450 rpm) 12.7 g Aerosil A380, 237 g CHMA, 80 g DVB, 2.56 g DMAEMA, 9.18 g SLS surfactant (at 30% solids) and 416 g DIW together. A 38.4 g of seed was taken from the monomer emulsion and pumped into the 2 L reactor at 77° C. An initiator solution prepared from 1.22 g of ammonium persulfate in 34.3 g of DIW was added over 20 minutes after the seed emulsion addition. The remaining monomer emulsion was fed into the reactor over 120 min. Once half the monomer emulsion was added the rpm in the reactor was increased to 450 rpm. At the end of the monomer feed, the latex used a post-processing protocol of 1 hr at 77° C. followed by a 2 hr ramp to 87° C. and a 1 hr hold at 87° C. to reduce residual monomer at the end of the emulsion polymerization step. As well, the reactor rpm was further increased to 530. The resultant latex containing 20% percent solids and a particle size of 87 nm was obtained.

Comparative Example 3: Synthesis of an Organic Polymeric Cross-Linked Latex without Silica A latex was prepared as in Example 1, but without the addition of any inorganic fine particles.
SEM of Example 2 is shown in FIG. 1.

Toner and Developer Preparation and Evaluation

Xerox 700 parent black toner was blended on 10-L Henschel type blender (manufactured by Reliance) with the additive formulation in Table 2. Each additive formulation also included 0.95 pph of one of the organic additive latexes of Example 1 or Comparative Example 2.

Toner Example 3 was the toner blended with the organic additive latex of Example 1.

Comparative Toner Example 4 was the toner blended with the organic additive latex of Comparative Example 3.

TABLE 1

Additive formulation added with organic additive

| Additive | Loading (pph) |
| --- | --- |
| 40 nm hydrophobic silica | 2.3 |
| 23 nm hydrophobic titania | 0.8 |
| Zinc stearate | 0.09 |
| Strontium titanate | 0.14 |

For charge evaluation for each toner, 30 g of Xerox 700 carrier was used along with 1.50 g of the blended toner in 60 mL glass bottles. This gave a toner concentration, or TC, of 5%. Samples were conditioned three days in a low-humidity zone (J zone) at 21.1° C. and 10% RH, and in a separate sample in a high humidity zone (A zone) at about 28° C. and 85% relative humidity. The developers were charged in a Turbula mixer for 60 minutes.

The toner charge was measured as the charge per mass ratio (Q/M) was also determined by the total blow-off charge method, measuring the charge on a faraday cage containing the developer after removing the toner by blow-off in a stream of air. The total charge collected in the cage is divided by the mass of toner removed by the blow-off, by weighing the cage before and after blow-off to give the Q/M ratio. The toner charge was also measured in the form of q/d, the charge to diameter ratio. The q/d was measured using a charge spectrograph with a 100 V/cm field, and was measured visually as the midpoint of the toner charge distribution. The charge was reported in millimeters of displacement from the zero line (mm displacement can be converted to femtocoulombs/micron (fC/μm) by multiplying by 0.092). Toner Charge Maintenance was measured as follows. A developer sample was prepared by weighing 1.5 g of additive toner onto 30 g of carrier (5 pph) in a washed 60 ml glass bottle. The developer was conditioned in an A-zone environment of 28° C./85% RH for three days to equilibrate fully. The developer was charged by agitating the sample for 2' in a Turbula mixer. The charge per unit mass of the sample was measured using a tribo blow-off. The sample was then returned to the A-zone chamber in an idle position. The charge per unit mass measurement was repeated again after 24 hours and 7 days. Charge maintenance is calculated from the 24 h and 7 day charge as a percentage of the initial charge.

For flow evaluation, the % cohesion at lab ambient temperature was obtained using a Hosokawa Micron Powder Tester. Two grams of the blended toner at lab ambient conditions was placed on a the top screen in a stack of three pre-weighed mesh sieves, which were stacked as follows in a Hosokawa flow tester: 53 μm on top, 45 μm in the middle, and 38 μm on the bottom. A vibration of 1 mm amplitude was applied to the stack for 90 seconds. The flow cohesion % is calculated as: % Cohesion=(50*A+30*B+10*C)

Toner blocking was determined by measuring the toner cohesion at elevated temperature above room temperature for the toner blended with surface additives. Toner blocking measurement was completed as follows: two grams of additive blended toner was weighed into an open dish and conditioned in an environmental chamber at the specified elevated temperature and 50% relative humidity. After about 17 hours the samples were removed and acclimated in ambient conditions for about 30 minutes. Each re-acclimated sample was measured by sieving through a stack of two pre-weighed mesh sieves, which were stacked as follows: 1000 μm on top and 106 μm on bottom. The sieves were vibrated for about 90 seconds at about 1 mm amplitude with a Hosokawa flow tester. After the vibration was completed the sieves were reweighed and toner blocking is calculated from the total amount of toner remaining on both sieves as a percentage of the starting weight. Thus, for a 2 gram toner sample, if A is the weight of toner left the top 1000 μm screen and B is the weight of toner left the bottom 106 μm screen, the toner blocking percentage is calculated by: % blocking=50 (A+B). The % blocking was measured in this way at different temperatures varying by about 1° C. around the expected blocking point. The blocking temperature was taken as the temperature where the % blocking increased to 20%. The results of all the evaluation are shown in Table 2.

TABLE 2

| | Evaluation of the organic additive latexes | | | | | | | |
|---|---|---|---|---|---|---|---|---|
| | A-zone | | J-zone | | Charge Maintenance | | Blocking Onset Temperature | Flow Cohesion |
| | Q/D | Q/M | Q/D | Q/M | 24 h CM | 7 d CM | (° C.) | (%) |
| Toner Example 3 | 6.5 | 30 | 10.6 | 50 | 95 | 83 | 52.8 | 34 |
| Toner Comparative Example 4 | 5.7 | 28 | 9.5 | 41 | 91 | 83 | 52.3 | 46 |

As shown in Table 2, the addition of a negatively charging silica to the polymeric crosslinked latex increases the charge, both Q/D and Q/M in both environmental zones relative to the Comparative Example 4. Also, the charge maintenance % is improved at 24 hours, similar at 7 days, the blocking onset temperature is increased and the flow cohesion is reduced compared to Comparative Example 4.

Some further evaluation was done to measure print quality of the toner of Example 3 compared to toner of Comparative Example 4. Both toners were printed under A-zone conditions in a Xerox 700 printer. Both toners are black, however, this print test was done in a cyan housing. In this printer the black housing does not have a bias charging roller (BCR) to charge the photoreceptor, however, the cyan housing does. The purpose of the test was to understand the cleaning of the toner from the photoreceptor and the BCR, so the test was done in the cyan housing. The test protocol is shown in Table 2. For each toner first 2000 prints were made at high 20% print area coverage of toner to changeover from the toner that was in the printer. A further 1000 prints of 20% print area coverage was then made. Printing was stopped and at this checkpoint, CP2, a print with a printed 100% solid toner patch of size 80 mm by 80 mm was examined. Visible spots were counted as enumerated in Table 3. The print run continued to CP3 at a low area coverage of 0.4%, which is very stressful for poor cleaning. Again, spots were counted and the run continued as shown in the table to CP4. The toner of Example 3 was nearly perfectly void of spots, showing a total of only 2 spots over the four checkpoints. The toner Comparative Example 4 showed much worse spots, with a total of 61 over the same checkpoints.

TABLE 3

| Printing conditions | | | Spots count (100% solid patch) | |
|---|---|---|---|---|
| CheckPoint | Area Coverage (%) | Prints in Segment | Total Prints | Toner Comparative Example 4 | Toner Example 3 |
| CP1 | 20 | 2000 | 2000 | Not measured | Not measured |
| CP2 | 20 | 1000 | 3000 | 0 | 0 |
| CP3 | 0.4 | 1878 | 4878 | 10 | 0 |
| CP4 | 0.4 | 2312 | 7190 | 51 | 2 |

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A toner composition comprising:
   toner particles comprising at least one resin, an optional colorant, an optional wax, and a polymeric toner additive on at least a portion of an external surface of the toner particles, the polymeric toner additive comprising:
   a crosslinked polymer particle on a surface of the toner particles, the crosslinked polymer particle comprising at least a hydrophobic monomer comprising a non-fluorinated monomer having a carbon to oxygen (C/O) ratio of 3 or greater or a fluorinated monomer, a second monomer comprising two or more vinyl groups present in an amount from about 8 wt % to about 40 wt % of the copolymer, a metal oxide and optionally a charge control agent monomer, and wherein the crosslinked polymer particle has a crosslink density of 0.19 or greater; and
   a fluorinated crosslinking agent.

2. The toner composition of claim 1, wherein the non-fluorinated monomer has a C/O ratio of 4 or greater.

3. The toner composition of claim 1, wherein the fluorinated monomer comprises a fluorinated acrylate monomer or fluorinated methacrylate monomer.

4. The toner composition of claim 1, wherein the fluorinated monomer comprises trifluoroethylmethacrylate.

5. The toner composition of claim 1, wherein the charge control agent comprises a nitrogen containing group at 0.1 wt % to 1.5 wt % of the polymeric resin.

6. The toner composition of claim 5, wherein the charge control agent comprises an acrylate or methacrylate monomer.

7. The toner composition of claim 1, wherein the second monomer comprises divinyl benzene.

8. The toner composition of claim 1, wherein the metal oxide is selected from the group consisting of: silica, titania and alumina.

9. The toner composition of claim 1, wherein the toner particles comprise an emulsion aggregation toner having a size from about 4 microns to about 10 microns.

10. The toner composition of claim 1, wherein the crosslinked polymer particle comprises a size of from 20 nanometers to 200 nanometers.

11. A developer comprising: a toner composition; and a toner carrier, wherein the toner composition comprises: toner particles comprising at least one resin, an optional colorant, an optional wax, and a polymeric toner additive on at least a portion of an external surface of the toner particles, the polymeric toner additive comprising:
   a crosslinked polymer particle on a surface of the toner particles comprising at least a hydrophobic monomer comprising a non-fluorinated monomer having a carbon to oxygen (C/O) ratio of 3 or greater or a fluorinated monomer, a second monomer comprising two or more vinyl groups present in an amount from about 8 wt % to about 40 wt % of the copolymer, a metal oxide and optionally a charge control agent monomer, and wherein the crosslinked polymer particle has a crosslink density of 0.19 or greater; and a fluorinated crosslinking agent.

12. The developer of claim 11, wherein the metal oxide is selected from the group of consisting of: silica, titania and alumina.

13. The developer of claim 11, wherein the crosslinked polymer particle comprises a size of from 20 nanometers to 200 nanometers.

14. The developer of claim 11, wherein the metal oxide comprises a particle size of from 7 nanometers to 50 nanometers.

15. A toner additive comprising:
a crosslinked polymer particle comprising at least a hydrophobic monomer comprising: a non-fluorinated monomer having a carbon to oxygen (C/O) ratio of 3 or greater or a fluorinated monomer, a second monomer comprising two or more vinyl groups present in an amount from about 8 wt % to about 40 wt % of the copolymer, a metal oxide and optionally a charge control agent monomer, and wherein the crosslinked polymer particle has a crosslink density of 0.19 or greater; and a fluorinated crosslinking agent.

16. The toner additive of claim 15, wherein the non-fluorinated hydrophobic monomer has a carbon to oxygen ratio of 4 or greater.

17. The toner additive of claim 15, wherein the fluorinated hydrophobic monomer comprises a fluorinated acrylate monomer or fluorinated methacrylate monomer.

18. The toner additive of claim 15, wherein the metal oxide is selected from the group of consisting of: silica, titania and alumina.

19. The toner additive of claim 15, wherein the crosslinked polymer particle comprises a size of from 20 nanometers to 200 nanometers.

* * * * *